(12) United States Patent
Golovatai-Schmidt

(10) Patent No.: US 6,613,220 B2
(45) Date of Patent: Sep. 2, 2003

(54) SIEVE FILTER FOR FLUID CONDUITS, ESPECIALLY FOR HYDRAULIC PRESSURE LINES IN INTERNAL COMBUSTION ENGINES

(75) Inventor: Eduard Golovatai-Schmidt, Röttenbach (DE)

(73) Assignee: INA-Schaeffler KG, Herzogenaurach (DE)

( * ) Notice: Subject to any disclaimer, the term of this patent is extended or adjusted under 35 U.S.C. 154(b) by 29 days.

(21) Appl. No.: 10/023,524

(22) Filed: Dec. 18, 2001

(65) Prior Publication Data
US 2002/0074272 A1 Jun. 20, 2002

(30) Foreign Application Priority Data
Dec. 19, 2000 (DE) .......................................... 100 63 285

(51) Int. Cl.⁷ ............................................ B01D 35/147
(52) U.S. Cl. ...................... 210/130; 210/168; 210/430; 210/497.01; 210/499; 137/543.19; 123/196 A
(58) Field of Search ................................ 210/130, 132, 210/136, 168, 430, 459, 497.01, 499; 123/196 A; 137/539, 540, 543.19

(56) References Cited

U.S. PATENT DOCUMENTS 3,120,490 A * 2/1964 Samson ...................... 210/132
4,246,109 A    1/1981 Manders
5,558,058 A * 9/1996 Ming et al. ............. 123/196 A

FOREIGN PATENT DOCUMENTS

| DE | 3718068 C1 | 6/1988 |
| DE | 3904701 A1 | 8/1990 |
| DE | 4037952 A1 | 6/1992 |
| DE | 19546440 A1 | 6/1997 |

* cited by examiner

Primary Examiner—Joseph Drodge
Assistant Examiner—Terry K. Cecil
(74) Attorney, Agent, or Firm—Volpe and Koenig, P.C.

(57) ABSTRACT

A sieve filter (1) for fluid lines or conduits which are formed of an annular disk-like fluid inlet (3) and an annular disk-like fluid outlet (4) with a fine mesh filter element arranged there between that is braced by stiffening bars (5), and which has a bypass function when the filter element (6) is stopped up or with highly viscous fluid. The fluid inlet (3) of the sieve filter (1) is constructed with the bypass function in that it has a smaller outside diameter than the fluid outlet (4) and is sealed off by a pressure relief valve (7). When the filter element (6) is stopped up or with highly viscous fluid in the line, the fluid inlet (3) is cleared by opening the pressure relief valve (7) as a bypass, through which the fluid is conducted unfiltered to the fluid outlet (4) of the sieve filter (1).

5 Claims, 3 Drawing Sheets

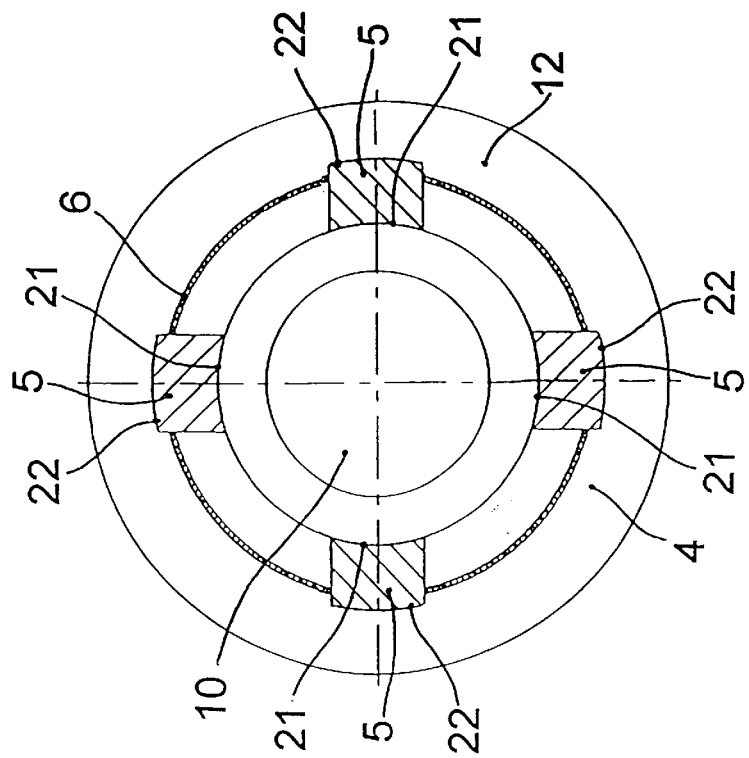
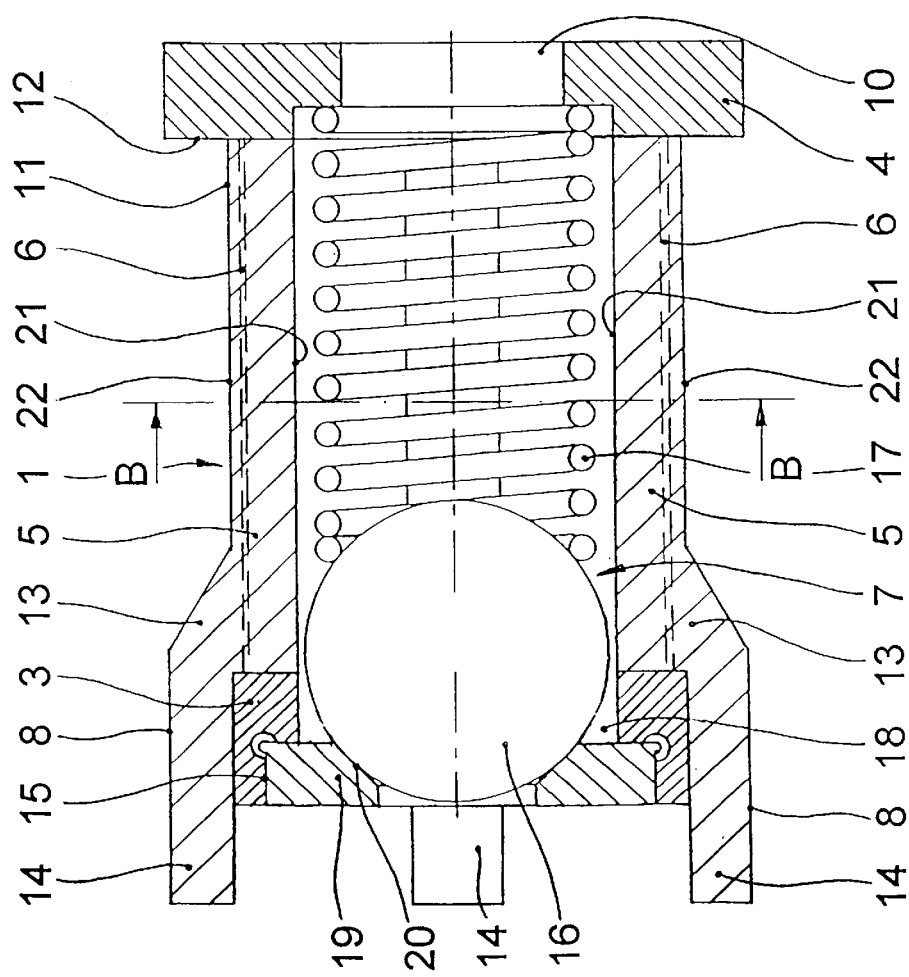

SIEVE FILTER FOR FLUID CONDUITS, ESPECIALLY FOR HYDRAULIC PRESSURE LINES IN INTERNAL COMBUSTION ENGINES

BACKGROUND

The invention is directed to a sieve filter for fluid conduits according to the features of the preamble of claim 1, and it is especially advantageously suited for hydraulic pressure lines in internal combustion engines.

It is generally known to the person skilled in the art that, after assembly of the individual parts of an internal combustion engine, it cannot be avoided that some finishing-related dirt particles, such as shavings, jointing solution residues and the like, remain in the interior of internal combustion engines despite cleaning of the individual parts. Especially with internal combustion engines which are outfitted with a hydraulic device for relative rotation of the camshaft in relation to the crankshaft of the internal combustion engine, there exists the danger that these dirt particles enter into the lubricant circulation of the internal combustion engine from which mostly the device for relative rotation of the camshaft is also hydraulically supplied. Since as a rule an electromagnetic control valve is connected in series ahead of this device, which controls the fluid feed and removal to and from this device through one of the camshaft bearings in the cylinder head of the internal combustion engine, it is consequently not to be ruled out that if dirt particles exceed a certain magnitude, they will cause impairments in the function of the control valve up to possibly completely blocking it. A thorough cleaning of the individual parts of the internal combustion motor for avoiding these impairments of function has, however, above all in mass production, proven to be uneconomical, so that in order to create a remedy, first of all a fine mesh wire filter was incorporated into the oil channel to the electromagnetic control valve of the device. This filter indeed protects the control valve from the penetration of dirt particles, but in practice it has nonetheless become apparent that if the filter becomes completely stopped up, not only do malfunctions occur with the device to be controlled, but also to an undersupply of lubricants to the camshaft bearings which, in the worst case, may result in total failure of the internal combustion engine due to bearing seizures.

Another sieve filter is known, which was actually provided for incorporation into the flow pathway of a hydraulic signaling device of a fuel injection pump for an internal combustion engine, but also appears suited to solve the aforementioned problem due to providing a bypass function for the case of paraffin stoppage of its filter element at extremely low temperatures. This is disclosed in the genus-forming DE 37 18 068 C1. This rod-like sieve filter basically consists of an annular disk-like fluid inlet and a likewise annular disk-like fluid outlet, between which the filter element subject to fluid flow and supported by stiffening bars is arranged. The filter element is constructed as tapering in the direction of flow and is in each case connected with the fluid inlet fit into the pressure conduit as well as with the fluid outlet having a smaller diameter through the ends of its stiffening bars. In the interior of the sieve filter, there in addition extends over the entire length of the filter element a bypass pipe arranged concentrically in relation thereto, the inlet side of which is situated in the area of the fluid inlet and the outlet side of which is sealingly connected with the fluid outlet. On the inlet side, the bypass pipe has a pressure relief valve which can open against a spring force. The relief valve has a ball as a closing member, and the valve seat is situated at the entrance of the bypass pipe.

The disadvantage with these known sieve filters is, however, that their manufacture, due to the bypass pipe with the pressure relief valve, demands a relatively high manufacturing expenditure and costs. Equally, the relatively large space requirement for such a sieve filter has proven disadvantageous since this only guarantees an optimal function when constructed appropriately long and narrow.

SUMMARY

For this reason, underlying the invention is the object of providing a sieve filter for fluid conduits, especially for hydraulic pressure lines in internal combustion engines which is constructed compactly and space-saving and whose manufacturing expenditure and cost are reduced to a minimum.

In accordance with the invention, this objective is accomplished with a sieve filter according to the preamble of claim 1 such that the fluid inlet of the sieve filter itself is constructed with the bypass function in that first, the inlet has a smaller external diameter than the fluid outlet of the sieve filter, that is constructed with the same diameter of the pressure line, and in that secondly, this is sealed off by a pressure relief valve arranged in the interior of the sieve filter. Here the fluid inlet is coaxially fixed in position in the pressure conduit by distancing elements arranged on its outer diameter, between the interstices of which the fluid is passed when the filter element is not clogged or is filtered by the filter element when viscosity is normal along the internal walling of the pressure line. When the filter element is clogged or when the fluid is highly viscous, the fluid inlet is in contrast, clearable through an opening of the pressure relief valve as a bypass entrance resulting from the rise of fluid pressure in front of the sieve filter, through which the fluid is passed along the interior of the filter element unfiltered to the fluid outlet.

In an appropriate refinement of the sieve filter constructed in accordance with the invention, the stiffening bars of the filter elements are fastened with their outlet side ends on the internal side ring surface of the fluid outlet, while the inlet side ends of the stiffening bars of the filter elements are constructed with axial extensions which are connected with the outer surface of the fluid inlet. The axial extensions of the inlet side ends of the stiffening bars here project above the fluid inlet and are at the same time constructed as its radial distancing elements toward the interior walls of the pressure line which are coaxially fixed into position with those of the fluid inlet in the pressure line. Here it is, however, also possible to construct the inlet side ends of the stiffening bars of the filter elements without axial extension and to fasten them on the interior side ring surface of the filter inlet as well as to arrange separate distancing elements toward the interior walling of the pressure conduit on the outer surface of the fluid inlet with which the fluid inlet is fixed in position in the pressure conduit.

A further feature of the sieve filter constructed in accordance with the invention is that the pressure relief valve in the interior of the sieve filter preferably is formed by a valve ball lying on the fluid inlet as well as a prestressed spring element supported at the fluid outlet and on the valve ball. The spring element is preferably constructed as a compression coil spring, while the valve ball is a steel ball which together with the compression coil spring is inserted through the opening of the fluid inlet of the sieve filter into the sieve filter. Into this opening of the fluid inlet, an additional complementary annular disk is insertable which preferably is locked by means of a clip connection in the fluid inlet and which has on the filter interior side a concave recess constructed as an inlet-side back pressure surface for the valve ball of the pressure relief valve. It is also conceivable, however, to manufacture the fluid inlet and the annular disk insertable into this in one piece and to fasten this part after insertion of the valve ball and the compression coil spring in the sieve filter through a clip connection on the stiffening bars of the sieve filter. It is equally possible to insert, instead of the valve ball, a valve ball with a corresponding valve seat in the additional annular disk or also a cylindrical valve plate without valve seat in the annular disk into the sieve filter.

Furthermore, it is additionally proposed in configuring the sieve filter constructed according to the invention that the stiffening bars of the sieve filter carry the filter element of the sieve filter between its inside and outside which extends coaxially from the fluid inlet to the fluid outlet. For optimal support of the filter element, four evenly peripherally distributed stiffening bars have proven most advantageous here in which in the preferred manufacture of the sieve filter by plastic injection molding, the filter element is cast in. The exterior sides of the stiffening bars at the same time have in the area of axial extension of the filter element a distance toward the interior walling of the pressure line in order to be able to guarantee, by an uninterrupted annular space around the filter element, an evenly distributed fluid flow through the filter element as well as a greater fluid throughput through the filter element. At the same time the interior sides of the stiffening bars are constructed in the same area as guide paths for the valve ball of the pressure relief valve, whereby, for attaining the greatest possible guide surface on the stiffening bars, a construction of the stiffening bars with a rectangular or square contour cross section as well as with concavely constructed interiors has proven especially advantageous.

Finally, it is furthermore proposed in preferred application of the sieve filter constructed in accordance with the invention that the hydraulic pressure conduit or line into which the sieve filter is inserted is preferably constructed as an oil channel to a device for relative rotation of a camshaft in relation to a crankshaft of an internal combustion motor. This hydraulic device is supplied with hydraulic fluid in a known manner from the lubricant circulation of the internal combustion engine, whereby an electromagnetic control valve is connected in series before the device which controls fluid delivery and removal to and from the device through one of the camshaft bearings in the cylinder head of the internal combustion engine.

The oil chamber connected with the lubricant pump and leading to this device for this reason opens first axially or radially into a continuing bore hole with a larger diameter which is provided to accommodate the cylinder valve element of the electromagnetic control valve for the device, and is worked into the cylinder head of the internal combustion engine or into a valve housing fastened on the cylinder head of the internal combustion engine. The base hole here preferably has such a depth that the sieve filter together with the valve element of the electromagnetic control valve is inserted into the base hole and can be axially fixed in position directly in front of the valve element. The axial fixing into position of the sieve filter here takes place such that, on the one hand the inlet side extensions of the stiffening bars of the filter elements lie on the bottom of the base hole, and on the other hand is supported with the fluid outlet on the face of the valve element of the electromagnetic control valve. The arrangement of the sieve filter in the base hole of the valve element of the electromagnetic control valve consequently enables a compact and space saving construction of the sieve filter whereby the sieve filter nonetheless can also be arranged, through local diameter extensions, inside the oil duct or through a narrower design at any place before the electromagnetic control valve of the device.

The sieve filter constructed in accordance with the invention, especially for hydraulic pressure lines in internal combustion engines, consequently has in comparison with the sieve filters known on the basis of the state of the art, the advantage that its bypass function is integrable without additional components such as bypass pipes or the like into the existing components so that the sieve filter can be constructed as compact and space-saving overall and can be manufactured with the lowest finishing and expenditure possible.

BRIEF DESCRIPTION OF THE DRAWING(S)

The invention is described in greater detail on the basis of a preferred embodiment of the invention shown in the drawings, wherein:

FIG. 2 is a longitudinal cross-sectional view taken along line A—A of FIG. 1 through the sieve filter constructed in accordance with the invention;

FIG. 3 is a cross-sectional view taken along line B—B in FIG. 2 through the sieve filter constructed in accordance with the invention;

DETAILED DESCRIPTION OF THE PREFERRED EMBODIMENT(S)

Figure 1:
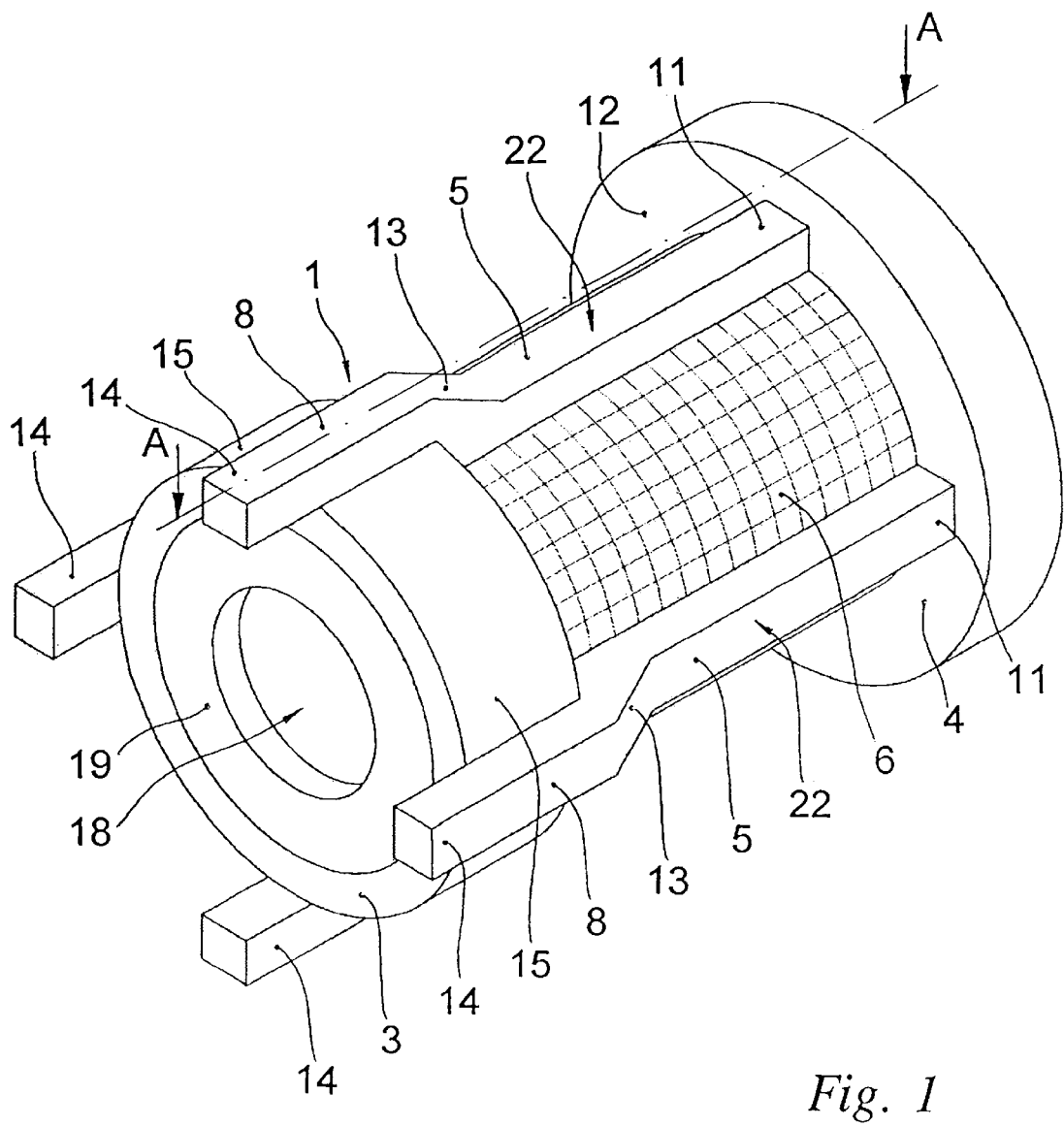
FIG. 1 is a greatly enlarged three dimensional representation of the sieve filter constructed in accordance with the invention.
Figure 4:
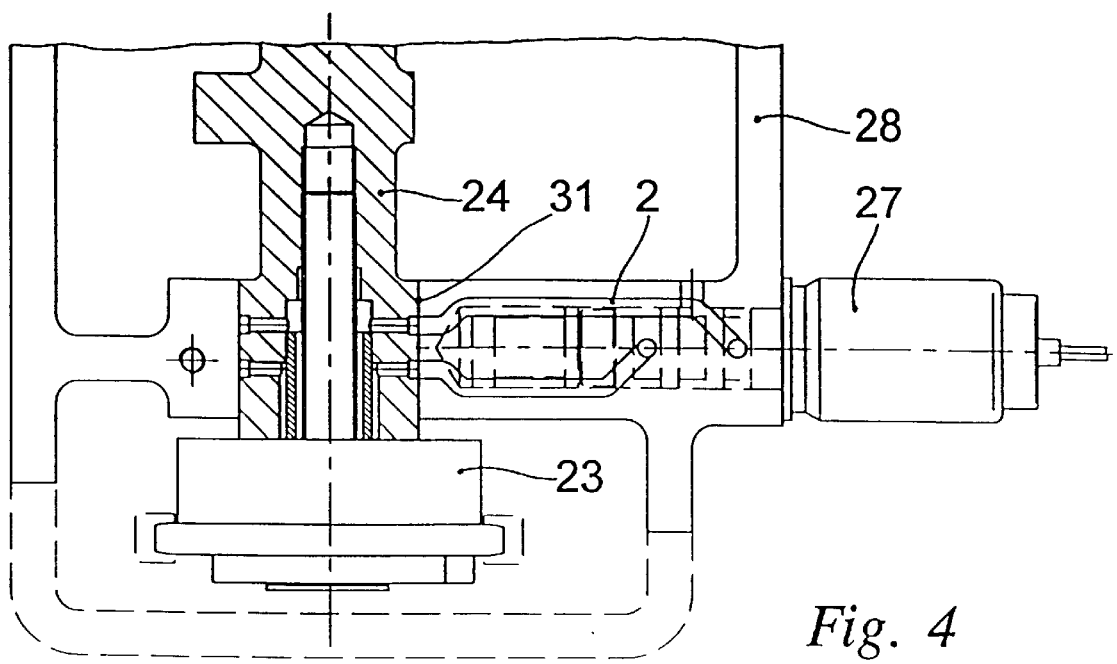
FIG. 4 is a partial plan view on the cylinder head of an internal combustion engine with a device for relative rotation of the camshaft relative to the crankshaft.
Figure 5:
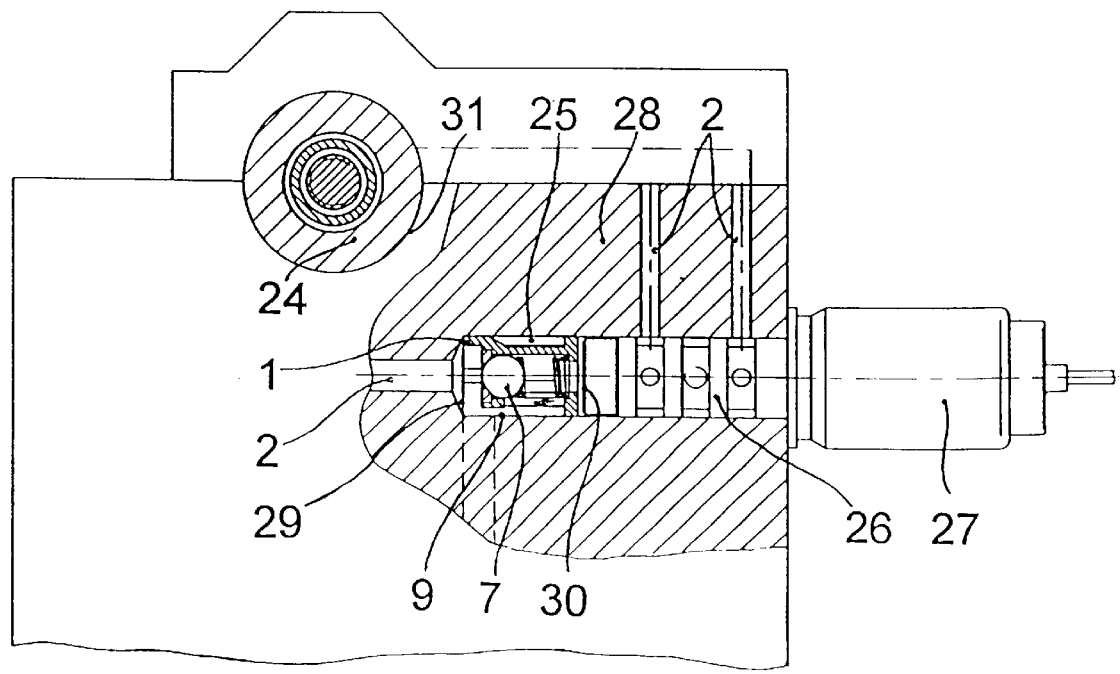
FIG. 5 is a partial side view of the cylinder head of an internal combustion engine with a sieve filter constructed in accordance with the invention arranged in front of the electromagnetic control valve of the invention.

A sieve filter 1 for fluid lines is clearly apparent from FIG. 1 which is especially suited for hydraulic pressure lines 2 in internal combustion engines, as represented by way of example in FIGS. 4 and 5. The sieve filter 1 basically comprises an annular disk-like fluid inlet 3 and a likewise annular disk-like fluid outlet 4 between which a fine mesh filter element 6 through which fluid flows is supported by stiffening bars 5.

It is furthermore apparent from FIGS. 1 and 2 that the sieve filter 1 (in the event that its filter element 6 is clogged with dirt particles filtered out of the fluid, or its filter element 6—at extremely low temperatures and correspondingly high viscosity of the fluid only allows a deficient fluid passage) has an additional bypass function which in accordance with the invention is provided by the fluid inlet 3 of the sieve filter itself. It can clearly be seen in the drawings that the fluid inlet 3 of the sieve filter 1 has for this purpose a smaller outside diameter than the fluid outlet 4 of sieve filter 1, which is constructed with the diameter of the pressure line 2, and at the same time is permanently sealed off by a pressure relief valve 7 arranged in the interior of the sieve filter 1. In connection with this, the fluid inlet 3 is fixed in position coaxially in pressure line 2 by distancing elements 8 arranged on its outside diameter so that the fluid (when the filter element 6 is not stopped up or with normal viscosity) is guided through the spaces between the distancing element 8 along the interior walling 9 of the pressure line 2 through the filter element 6 to the opening 10 of the fluid outlet 4. When the filter element 6 is stopped up or in the event of highly viscous fluid, the fluid inlet 3 in contrast is opened by the pressure release valve 7 as a bypass entry based on an increase in fluid pressure before the sieve filter 1, due to which the fluid reaches the opening 10 of the fluid outlet 4 along the interior of the filter element 6.

In FIG. 2, it is shown in this regard that the pressure relief valve 7 in the interior of the sieve filter 1 is formed from a valve ball 16 lying on a fluid inlet 3 as well as a spring element 17 braced on the fluid outlet 4 and the valve ball 16. The valve ball 16 is constructed as a steel ball and the spring element 17 is constructed as a preloaded compression coil spring. The valve ball 16 here does not lie directly on the fluid inlet 3, but rather on a complementary annular disk 19 inserted into the opening 18 of fluid inlet 3 which is locked through a clip connection (which is only indicated in the drawing) in the fluid inlet 3 and which on the filter interior has a concave recess 20 (constructed as an inlet side back pressure surface or as a valve seat) for the valve ball 16 of the pressure relief valve 7.

In addition to this, it is recognizable from FIGS. 1 and 2 that the filter element 6 has four stiffening bars 5, evenly distributed peripherally, which are fastened (for further realization of the bypass function of the sieve filter 1) with their outlet side ends 11 on the interior lateral ring surface 12 of the fluid outlet 4. The inlet side ends 13 of the stiffening bars 5 of the filter elements 6 are in contrast constructed with extensions 14 extending over the fluid inlet 3, which are connected with the outside surface 15 of the fluid inlet 3 and at the same time are constructed as radial distancing elements 8 to the internal walling 9 of pressure line 2. The filter element 6 of the sieve filter here extends axially from the fluid inlet 3 up to the fluid outlet 4 of the sieve filter 1 and is (as is especially apparent from FIG. 3) cast in during the manufacture of the sieve filter 1 by plastic injection molding between the interior sides 21 and the exterior sides 22 of the stiffening bars 5. It is equally clear from the representation of FIG. 3 that the stiffening bars 5 are constructed with a rectangular or annular ring segment-like contour cross section and are fastened on the inner lateral ring surface 12 of fluid outlet 4 such that the exterior sides 22 of the stiffening bars 5 have (in the region of the axial extension of the filter element 6, as depicted in FIGS. 1 and 2) a distance from the internal walling 9 of pressure conduit 2. In this way, an uninterrupted annular space for evenly distributed fluid flow against the filter element 6 is created around the filter element 6 of the sieve filter 1, while the interior sides 21 of the stiffening bars 5 at the same time form, through the concave contour cross section, guide pathways for the valve ball 16 of the pressure relief valve 7.

In FIGS. 4 and 5, a concrete application of the sieve filter 1 constructed in accordance with the invention is represented wherein the pressure line 2 is constructed as an oil channel to a device 23 for relative rotation of a camshaft 24 in relation to a crankshaft (not represented) of an internal combustion engine. This device 23 is, as indicated in FIG. 4, supplied with hydraulic fluid from the lubricant circulation of the internal combustion engine in that, hydraulic fluid tapped from a camshaft bearing 31 in cylinder head 28 of the internal combustion engine, is fed through an electromagnetic control valve 27 to the device or taken off into the lubricant reservoir of the internal combustion engine. Proceeding from the camshaft bearing 31, the pressure conduit for this reason first opens axially, or, as indicated in FIG. 5 by dotted line representation, radially into an uninterrupted base hole 25 with a larger diameter which is provided to accommodate the cylinder valve element 26 of the electromagnetic control valve 27 for device 23, and is incorporated into the cylinder head 28 of the internal combustion engine. The base hole 25, as clearly shown, has a sufficient axial depth that the sieve filter 1 together with the valve element 26 of the electromagnetic control valve 27 is inserted into the base hole 25 and can be directly fixed axially into position in front of the valve element 26. As represented in FIG. 5, for this purpose the extensions 14 of the stiffening bars 5 of the spring element 6 have such an axial length that the sieve filter 1 on the one hand lies with these extensions 14 on the bottom 29 of the base hole 25 and on the other hand is braced with the fluid outlet 4 on the face 30 of the valve element 26 of the control valve 27. With the depiction of the sieve filter 1 in FIG. 5, the representation of the lower stiffening bar 5 of the filter element 6 is dispensed with here in order to make clear how the fluid is conducted (when the filter element 6 is not stopped up or when viscosity is normal) between the interstices of the stiffening bars 5 along the interior walling 9 of the base hole 25 through the filter element 6 to the fluid outlet 4 of the sieve filter 1. If the filter element 6 is clogged by dirt particles or the viscosity of the fluid is high, the pressure relief valve 7 in the interior of the sieve filter 1 opens and the fluid flow takes place along the interior of the filter element 6 to the fluid outlet 4 of the sieve filter 1.

Reference Number List

1 Sieve filter
2 Pressure line
3 Fluid inlet
4 Fluid outlet
5 Stiffening bars
6 Filter element
7 Pressure relief valve
8 Distancing elements
9 Inner walling
10 Opening
11 Outlet side end
12 Lateral ring surface
13 Inlet side ends
14 Extensions
15 Outer jacket surface
16 Valve ball
17 Spring element
18 Opening
19 Annular disk
20 Recess
21 Interior side
22 Exterior side
23 Device
24 Camshaft
25 Base hole
26 Valve element
27 Control valve
28 Cylinder head
29 Base hole bottom
30 Face
31 Camshaft bearing

What is claimed is:
1. Sieve filter arrangement in a fluid conduit, comprising an annular ring-like fluid inlet (3) and an annular disk-like fluid outlet (4), as well as a fine mesh filter element (6)

arranged between the fluid inlet and fluid outlet to allow fluid flow therethrough, and braced by stiffening bars (5), wherein the fluid inlet (3) of the sieve filter (1) is constructed with a smaller outside diameter than the fluid outlet (4) of the sieve filter (1) to provide a bypass function, the fluid outlet (4) is constructed with a diameter equal to a diameter of the conduit (2), and a pressure relief valve (7) is arranged in an interior of the sieve filter (1), whereby the fluid inlet (3) is fixed in place coaxially in the conduit (2) through radial distancing elements (8) arranged on an outer diameter thereof between which the fluid is conductible when the filter element (6) is not clogged or with normal viscosity along an interior walling (9) of the conduit (2) filtered through the filter element (6) to the fluid outlet (4), such that if the filter element (6) is clogged or stopped due to highly viscous fluid, the pressure relief valve (7) of the fluid inlet (3) opens to provide as a bypass entry due to a rise of fluid pressure in front of the sieve filter (1), allowing the fluid to be conducted along an interior of the filter element (6) unfiltered to an opening (10) of the fluid outlet (4).

2. Sieve filter according to claim 1, wherein the stiffening bars (5) of the filter element (6) have outlet side ends (11) which are fastened to an inner lateral ring surface (12) of the fluid outlet (4), and the stiffening bars (5) of the filter element (6) have inlet side ends (13) which are constructed with extensions (14) that extend over the fluid inlet (3), and are connected with an outer surface (15) of the fluid inlet (3) and at the same time are constructed as the radial distancing elements (8) to the interior walling (9) of the conduit (2).

3. Sieve filter according to claim 2, wherein the pressure relief valve (7) in the interior of the sieve filter (1) comprises a valve ball (16) lying on the fluid inlet (3) as well as a prestressed spring element (17) braced on the fluid outlet (4) and on the valve ball (16), and an additional complementary annular disk (19) is insertable into an opening (18) of the fluid inlet (3) which on the filter interior side has a concave recess (20) for the valve ball (16) of the pressure relief valve (7).

4. Sieve filter according to claim 3, wherein the stiffening bars (5) have interior sides (21) and exterior sides (22), and the filter element (6) of the sieve filter (1) is carried by the stiffening bars (5) between the interior and exterior sides and extends from the fluid inlet (3) to the fluid outlet (4), whereby the exterior sides (22) of the stiffening bars (5) have in a region of the axial extension of the filter element (6) a separation in relation to the inner walling (9) of the conduit (2), and the interior sides (21) of the stiffening bars (5) in the same region are at the same time constructed as guide pathways for the valve ball (16) of the pressure relief valve (7).

5. Sieve filter according to claim 4, wherein the conduit (2) is constructed as an oil channel for a device (23) for relative rotation of a camshaft (24) to a crankshaft of an internal combustion engine and opens axially or radially into a continuing base hole (25) with a larger diameter, which is provided for accommodating a cylindrical valve element (26) of an electromagnetic control valve (27) for the device (23) and is incorporated into one of a cylinder head (28) of the internal combustion engine or a valve housing fastened on the cylinder head (28) of the internal combustion engine, the base hole (25) has a sufficient axial depth so that the sieve filter (1) is insertable together with the valve element (26) of the electromagnetic control valve (27) into the base hole (25) and is fixable in place directly in front of the valve element (26) such that the sieve filter is arranged with the extensions (14) of the stiffening bars (5) of the filter element (6), on a bottom (29) of the base hole and is also, braced with the fluid outlet (4) on a face (30) of the valve element (26) of the control valve (27).

* * * * *